United States Patent

[11] 3,588,748

[72] Inventors Masao Inaba; Harunobu Nakamura; Mineo Mizukami, Tokyo-To, Japan
[21] Appl. No. 768,405
[22] Filed Oct. 17, 1968
[45] Patented June 28, 1971
[73] Assignee Nippon Electric Company, Limited Tokyo-to, Japan
[32] Priority Oct. 19, 1967
[33] Japan
[31] 42/67340

[54] A MODULATOR EMPLOYING A PLURALITY OF UNIDIRECTIONAL ADMITTANCE CIRCUITS FOR GENERATING A PIECEWISE LINEAR APPROXIMATION OF THE DESIRED MODULATION CURVE
7 Claims, 4 Drawing Figs.

[52] U.S. Cl. .......... 332/44, 307/241, 328/71, 328/103, 328/152, 332/48
[51] Int. Cl. .......... H03c 1/12
[50] Field of Search .......... 332/13, 13 (IT), 43, 43 (B), 44, 45, 48; 325/49, 50, 137, 138; 328/71, 103—105, 152—154; 307/241—244

[56] References Cited
UNITED STATES PATENTS

| | | | |
|---|---|---|---|
| 2,248,250 | 7/1941 | Peterson | 325/50X |
| 2,535,303 | 12/1950 | Lewis | 307/243 |
| 2,556,200 | 6/1951 | Lesti | 307/242X |
| 3,482,309 | 12/1969 | Bouchard | 332/48X |

*Primary Examiner*—Alfred L. Brody
*Attorney*—Ostrolenk, Faber, Gerb and Soffen

ABSTRACT: A circuit for performing amplitude modulation of a carrier signal by a modulating signal. The carrier and modulating signal are first summed and then applied to the input of the modulator circuit which is comprised of a plurality of branch circuits, each having unidirectional impedance elements which are selectively rendered conductive in accordance with the instantaneous value of the input signal applied to the modulator for developing a current signal at the output of the modulator which is a predetermined function of the instantaneous value of the signal, the curve of said function being determined by the respective admittance values of the impedance elements employed in the modulator circuit.

First and second modulator circuits may be combined in a single circuit to provide for amplitude modulation and carrier wave suppression, or alternatively, four such modulator circuits may be used in combination to provide a high quality electronic resolver circuit for synthesizing orthogonally modulated vectors.

INVENTORS
MASAO INABA
HARUNOBU NAKAMURA
MINEO MIZUKAMI
BY
OSTROLENK, FABER, GERB & SOFFEN
ATTORNEYS

INVENTORS
MASAO INABA
HARUNOBU NAKAMURA
MINEO MIZUKAMI
BY
OSTROLENK, FABER, GERB & SOFFEN
ATTORNEYS

INVENTORS
MASAO INABA
HARUNOBU NAKAMURA
BY MINEO MIZUKAMI

OSTROLENK, FABER, GERB & SOFFEN
ATTORNEYS

A MODULATOR EMPLOYING A PLURALITY OF UNIDIRECTIONAL ADMITTANCE CIRCUITS FOR GENERATING A PIECEWISE LINEAR APPROXIMATION OF THE DESIRED MODULATION CURVE

The present invention relates to modulation systems, and more particularly to a novel modulator circuit for amplitude modulating a carrier wave signal through the use of a plurality of branch circuits each having unidirectional admittance components which are selectively rendered operative under control the instantaneous signal applied to the common input of the branch circuits to develop an output current whose characteristic curve represents a piecewise linear approximation of the desired modulation characteristics.

Amplitude modulation systems are well known and such prior art systems normally employ the nonlinear characteristics of diode tubes, multielectrode tubes, semiconductor diodes, transistors, and so forth in order to produce the desired amplitude modulation. Such components have the disadvantage of being seriously affected by the fluctuation and operating characteristics of such nonlinear elements, thereby making it impossible to obtain a highly stable modulator unaffected by temperature variations. Such prior art devices also suffer from the disadvantages of making it difficult or even impossible to obtain any desired modulation characteristics.

The present invention is characterized by providing a circuit capable of developing a piecewise linear approximation of the desired modulator characteristics through the use of a plurality of branch circuits, each consisting of unidirectional elements such as semiconductor diodes and resistors connected in series combination in each branch circuit. The elements employed in the circuit are selected and operated in such a manner that their nonlinear characteristics may be ignored for practical purposes, since their linear characteristics are predominant in the operation of the modulator of the present invention which is made possible through the ingenious circuit construction employed therein.

As was previously mentioned, the modulator circuit of the present invention is provided with a common input terminal having a first terminal of each of the branch circuits connected thereto. The remaining terminals of each of the branch circuits are coupled to a bleeder circuit which establishes biasing voltages for controlling the selective conduction of the branch circuits with accompanying changes in the instantaneous value of the input signal applied to the modulator. Appropriate selection of the operating characteristics and impedance values of the system components further enables the circuit to rather accurately and reliably reproduce any desired modulation characteristics while at the same time providing a modulator which has less deviation and which is highly stable even in the presence of ambient temperature variations as compared with conventional devices.

It is, therefore, one object of the present invention to provide a novel amplitude modulator employing a plurality of branch circuits having their input terminals connected in common and each being comprised of unidirectional admittance components whose values may be appropriately selected to reproduce any desired modulation characteristics such as a hyperbolic modulator, an exponential modulator and so forth, in addition to being capable of accurately producing a linear modulator.

The second object of the present invention is to provide a novel modulator circuit comprised of a plurality of branch elements having their input terminals connected in common for producing a piecewise linear approximation of any desired modulation characteristic and which is suitable for mass production, is characterized by not fluctuating under ambient conditions and has high quality and reliability due to the fact that the deviations in the modulation characteristics are determined by those elements which may be relatively easily improved in their precision characteristics as in the case of resistance deviations of a resistor.

Still another object of the present invention is to provide a novel electronic resolver circuit of high quality for synthesizing orthogonally modulated vectors through the provision of a plurality of electronic amplitude modulators each employing a number of branch circuits having unidirectional components capable of performing the synthesizing operation.

These as well as other objects will become apparent from the following description when taken in connection with the drawings in which.

Figures 1, 4:
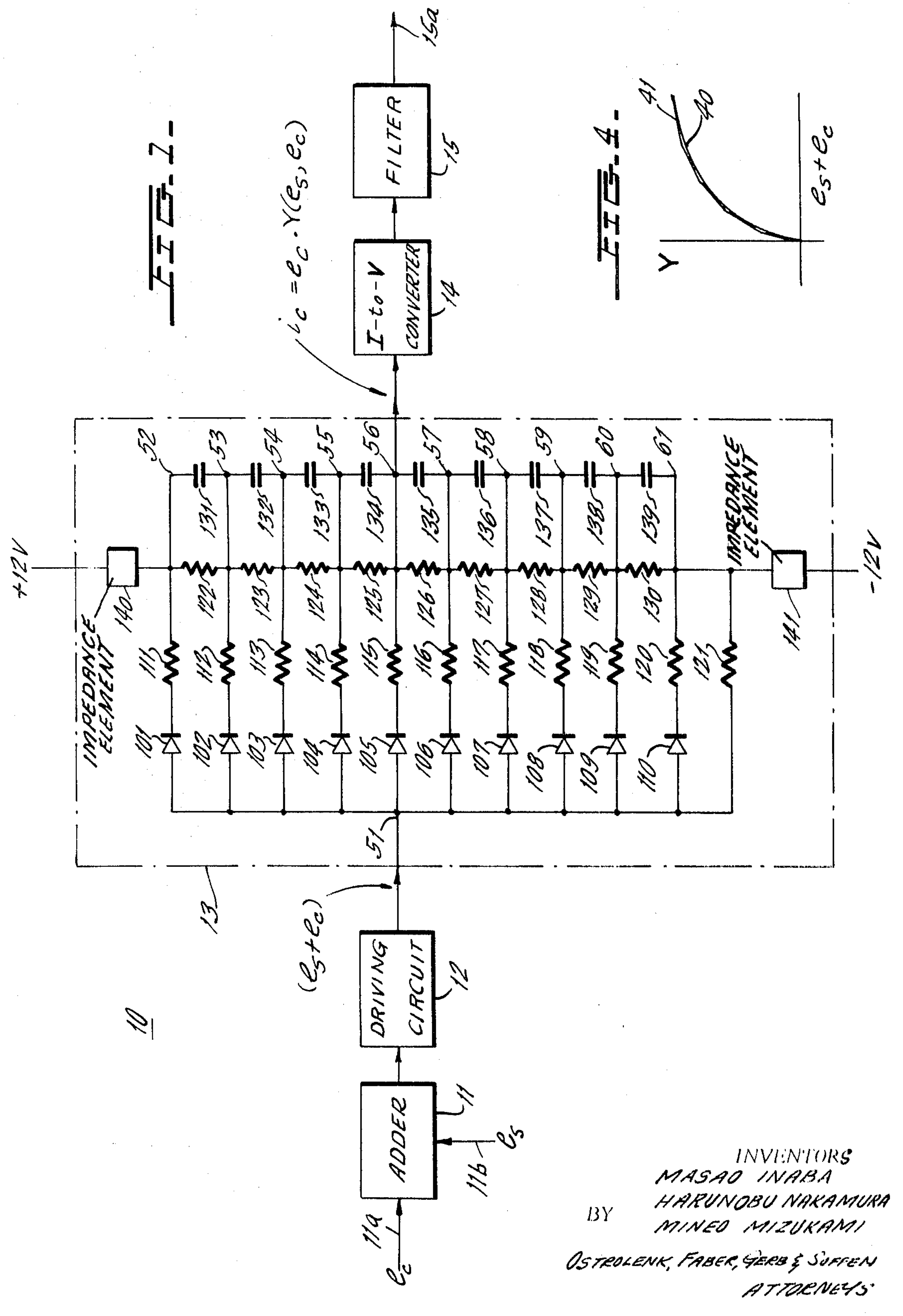
FIG. 1 is a schematic diagram of a modulator circuit incorporating the principles of this invention.
FIG. 4 is a plot showing a desired modulation curve and a piecewise linear approximation of said curve.

The preferred embodiment 10 of FIG. 1 is comprised of an adding or summing circuit 11 having input terminals 11*a* and 11*b* for receiving carrier wave $e_c$ and signal wave $e_s$, respectively. These signals are added in adder 11 and the sum $(e_c+e_s)$ is applied to the input of a driving circuit having a low output impedance for the purpose of driving a variable admittance circuit 13.

The carrier wave current is modulated due to the variation in admittance values of the components employed in circuit 13 the signal wave $e_s$, causing the output current leaving variable admittance circuit 13 to be modulated in accordance with the instantaneous value of the signal wave $e_s$. This modulated current is applied to the input of a current-to-voltage converter circuit 14. The output of circuit 14 is passed through a band-pass filter 15 to remove undesirable signals, and thereby develop a modulated output at terminal 15*a*.

The input terminal 51 of variable admittance circuit 13 couples the output of circuit 12 in common with the anode-electrodes of a plurality of semiconductor diodes 101 through 110, as well as an resistor 121. Each of the semiconductor diodes 101 through 110 are arranged in a plurality of branch circuits, each of which further contains a resistor element 111 through 120, respectively, which elements each have a first terminal connected to the cathode-electrode of their associated semiconductor diodes and have a second terminal coupled to one of a group of terminals arranged at spaced intervals along a series circuit comprised of resistor elements 122 through 130. A plurality of capacitor elements 131 through 139 are coupled in parallel fashion across an associated bleeder resistor 122 through 130, respectively. The bleeder resistors are further connected in series with impedance elements 140 and 141 which connect the bleeder circuit to positive and negative voltage levels, respectively, and which are designed to present a sufficiently high impedance to the modulated signal.

The operation of variable admittance circuit 13 is such that semiconductor diodes 101 through 110 each conduct when the output level of the low impedance output of driving circuit 12, i.e., the level of the control signal input 51, exceeds the bias potentials at the points 52 through 61, respectively, corresponding to the diodes 101 to 110, thereby respectively connecting the admittances 111 through 120 in series with the diodes 101 to 110 to conduct current. Hereinafter the series connection of diodes 101 through 110 and resistors 111 through 121, respectively will be referred to as unidirectional admittance branches.

As one example, let it be assumed that the signal level of the control signal at input 51 lies between the potentials at points 55 and 56 (with the bleeder elements 140, 122—130 and 141 acting as a voltage divider circuit), then the diodes 101 through 104 coupled to the bias potential points 52 through 55, respectively, will be reverse biased, effectively resulting in the disconnection of the resistors 111 through 114 from the circuit, while the diodes 105 through 110 connected to the bias potential points 56 through 61 are forward biased and conduct, thereby causing the resultant admittance of the circuit to assume a value consisting of the sum of the admittances of resistors 115 through 120 plus fixed admittance 121. Thus, the admittance value of the variable admittance circuit 13 can be made to vary depending upon the level of the signal at input 51 so that the magnitude of the carrier wave which passes through variable admittance circuit 13 and appears at its output terminal 56, is proportional to the resultant value Y of the admittance so as to achieve amplitude modulation of the carrier wave. In other words, the modulated wave output current $i_c$ of admittance circuit 13 may be represented by the equations $$i_c = e_c \cdot Y(e_s \cdot e_c)$$

and $$Y(e_s, e_c) = Y(e_s + e_c).$$

It should be noted that the bias current flowing through the bleeder circuit comprised of bleeder resistors 122 through 130 and impedances 140 and 141 should be sufficiently large so that the respective potentials at the points 52 through 61 may not be substantially varied by variations in the modulation signal $e_s$ applied to input terminal 51. In addition, bleeder circuit impedance components 140 and 141 should be designed to continuously present a high impedance to the modulated signal and to supply a current $i_c$ representing the modulated signal to be of sufficient magnitude when applied to current-to-voltage converter circuit 14.

The capacitors 131 through 139 are selected to have a sufficiently low reactive impedance with respect to the modulated signal $e_c$ and preferably have a far lower reactive impedance than the input impedance of the current-to-voltage converter circuit 14. As long as the bias voltage levels between adjacent bleeder resistors 122 through 130 are selected to be less than the conducting voltage across diodes 101 through 110, then a smooth modulation characteristic may be obtained. If the admittance values of resistors 111 through 120 ($Y_{111}$—$Y_{120}$) are selected to be sufficiently small with respect to the conductance $1/r$ of diodes 101 through 110, i.e., $1/r << Y_{111} - Y_{120}$, then the deviation and thermal variation in the resistance value $r$ of the diode conduction will be negligible with respect to the admittances of resistors 110 through 120 and the deviation of the modulation characteristics which results from these elements can be relatively easily improved simply by selecting high precision resistors for the elements 111 through 121. As a result of this, the advantages of the present invention reside in the fact that the modulator lends itself readily to mass production; provides a high quality modulation operation without fluctuation in characteristics; and allows for variation in the characteristics of the resultant admittance by the arbitrary selection of the admittance values of resistor elements 111 through 121 and arbitrary adjustment of the bias voltages at points 52 through 61 by proper selection of the values of bleeder resistors 121 through 130. For example, by selecting diodes 101 through 110 to have substantially identical operating characteristics and likewise by selecting admittances 111 through 121 and bleeder resistors 122 through 130 to likewise have identical operating characteristics, it is possible to provide for linear modulation of the carrier. Nonlinear modulation may be obtained, which modulation may follow any desired nonlinear curve, by judicious selection of the operating characteristics of diodes 101 through 110, resistors 111 through 121 and bleeder resistors 122 through 130, respectively.

Figure 2:
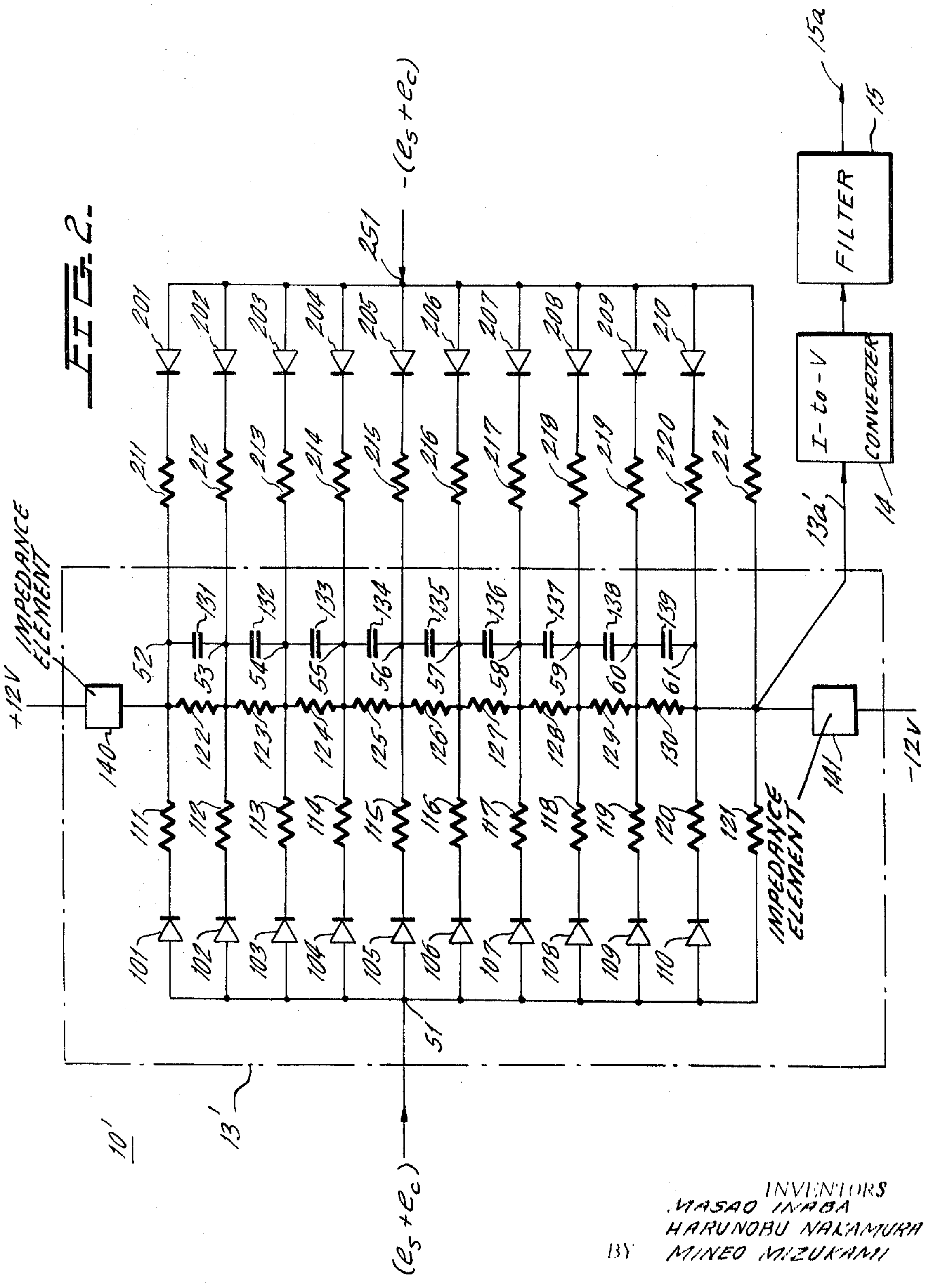
FIG. 2 is a schematic diagram of an alternative circuit embodiment of the present invention which is extremely advantageous for use in providing carrier wave suppression.

The same result as described above can be obtained if the diodes 101 through 110 are reversed in polarity or are replaced by transistors. FIG. 2, for example, shows a balanced modulator incorporating the features of the present invention wherein the balanced modulator 13' shown therein is comprised of a first group of unidirectional admittance branches 101—111 through 110—120 and a fixed admittance branch 121, and is further comprised of a second group of unidirectional admittance branches 201—211 through 210—220 and a second fixed admittance branch 221. For balanced modulation, the operating characteristics of the unidirectional admittance branches 101—111 through 110—120 and 201—211 through 210—220 should be selected to be substantially identical. The operating characteristics of fixed admittance branches 121 and 221 should likewise be substantially identical. In the embodiment 10' of FIG. 2, the signals to be modulated are applied to input terminals 51 and 251. The signals applied to these terminals are out of phase with one another so that, depending upon the magnitude of the control signals, the instantaneous admittance values of the two balanced circuits are caused to vary with the magnitude of their associated input signals, thereby yielding a differential modulated waveform signal at the output terminal **13*a'* which is applied to converter 14 and passes through bandpass filter 15 to yield a balanced modulation output signal. When the input signals applied to the balanced modulator are 180° out of phase and when components in the unidirectional admittance branches are chosen to have substantially identical operating characteristics, the superposition of the output signals of the respective modulators operate to suppress the carrier wave and produce only the sideband signal at the output 15*a***.

Figure 3:
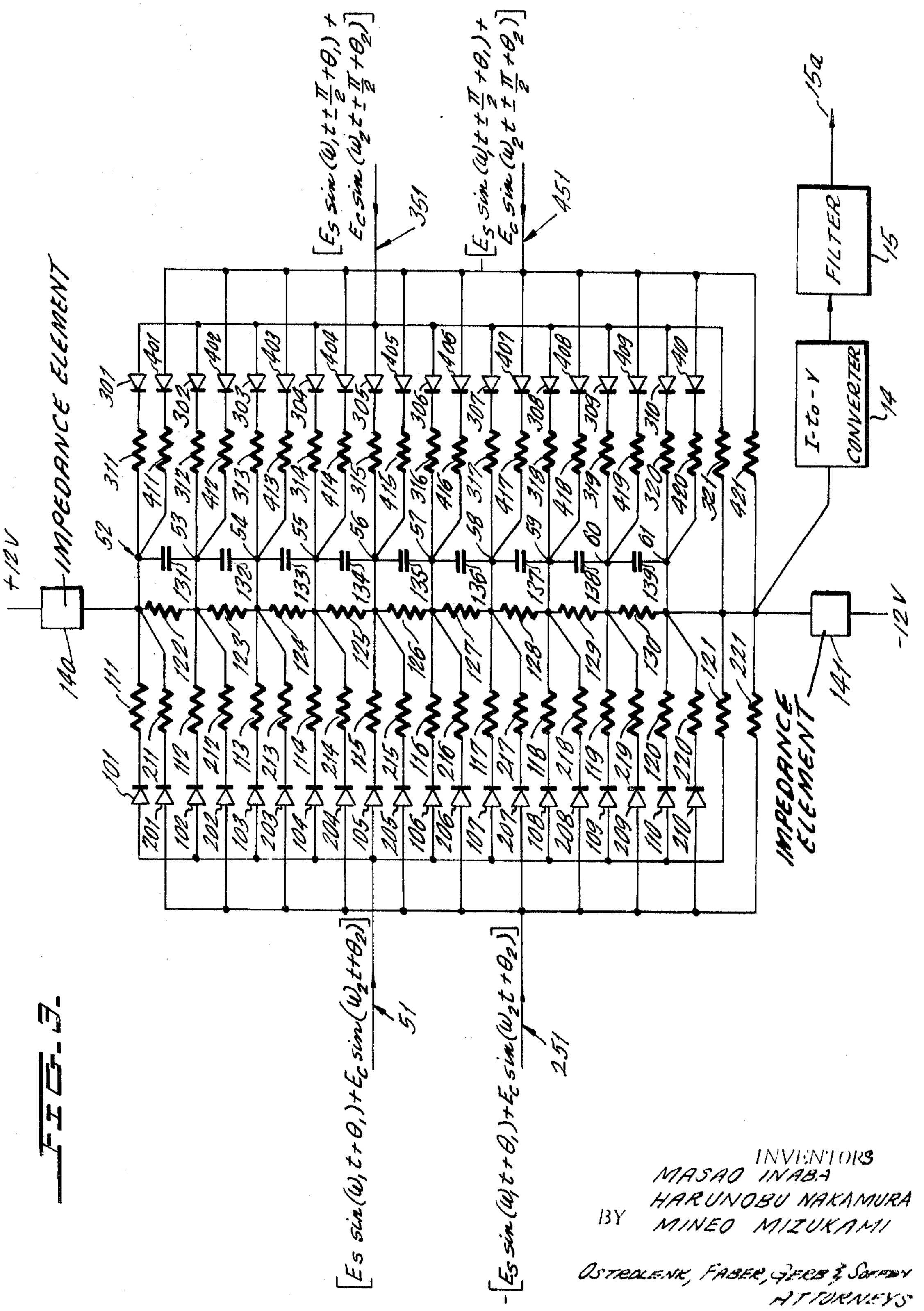
FIG. 3 shows still another schematic diagram of an alternative embodiment extremely advantageous for synthesizing orthogonally modulated vectors.

FIG. 3 shows still another preferred embodiment of the present invention which may be employed as an electronic resolver circuit of high quality for synthesizing orthogonally modulated vectors, which circuit incorporates the features of the present invention. To obtain the desired operation, diodes 101—110, 201—210, 301—310 and 401—410 are all selected so as to have substantially identical operating characteristics; resistors 111—121, 211—221, 311—321 and 411—421 are selected so as to have identical operating characteristics; and bleeder resistors 122—130 as well as reactance elements 131—139 are selected to be of equal value.

The phase relationships between the signals applied to input terminals 51 and 251 are such that the modulation signal and carrier wave are 180° out of phase with one another, and likewise the phase relationship between the signals applied to input terminals 351 and 451 are such that the modulation signal and carrier wave are 180° out of phase. The phase relationship between the signals applied to input terminals 51 and 351 are such that the signals are 90° out of phase, while the phase relationship between the signals applied to input terminals 251 and 451 are such that the signals are likewise 90° out of phase. The signal wave $e_s$ and the carrier wave $e_c$ signals may be represented by the following equation:

$$e_s = E_s \sin(\omega_1 t + \theta_1)$$

$$e_c = E_c \sin(\omega_2 t + \theta_2)$$

The above equations represent the instantaneous values of the carrier and modulation signals applied to the input terminals of the modulators. In the linear (or nonlinear) modulator of FIG. 1, these signals are summed and applied to the modulator. In addition to summing the carrier and modulator signals in the embodiment of FIG. 2, the sum and the negative of the sum are applied to the input terminals of the balanced modulator. In the embodiment of FIG. 3, the sum and the negative of the sum are applied to each of the input terminals 51, 251, 351 and 451 wherein the signals at 51 and 251 are 180° out of phase, the signals at 351 and 451 are 180° out of phase, the signals at 51 and 351 are 90° out of phase, and the signals at 251 and 451 are 90° out of phase so as to obtain (in the embodiment of FIG. 3) vector-synthesized signals which accurately control the phase of the carrier wave signal.

It can be seen from the foregoing that the present invention provides a novel amplitude modulator circuit which very closely and accurately approximates a modulation characteristic curve by means of a plurality of straight-line curve sections with the slope of each straight-line section closely approximating a portion of the ideal admittance curve by means of selectively inserting unidirectional admittance elements of each of the branch circuits of the modulator as the modulating signal varies in instantaneous value. The modulator of the present invention may more closely and accurately approximate an ideal admittance curve by increasing the number of unidirectional admittance elements, bleeder resistors and reactive components employed in the modulator so that each straight-line section of the actual admittance curve is reduced in length and thereby falls closer to the ideal curve. Considering FIG. 4, for example, wherein summation of the carrier signal and modulation signal is plotted along the abscissa and admittance is plotted along the ordinate, the continuous curve 40 represents the ideal modulation characteristic, while the curve 41 which is made of a plurality of straight-line segments, represents the close piecewise linear approximation to the ideal curve obtained through the use of the modulator of the present invention. A transition from one straight-line segment to the next indicates conduction of an increasing number of said semiconductor diodes.

It can, therefore, be seen from the foregoing description that the present invention provides a novel circuit for synthesizing any desired modulation characteristic through the use of a plurality of unidirectional admittance branches each consisting of semiconductor components and admittances (i.e., fixed resistors) whose values are selected to approximate any desired modulation curve. The simplicity of the circuit further lends itself readily to mass production techniques.

Although the present invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

We claim:

1. A balanced modulator for amplitude modulating a carrier wave signal with a modulation signal in accordance with a predetermined modulation characteristic being comprised of:
   - first and second means for simultaneously summing said carrier wave and modulation signals;
   - first and second variable admittance networks each having a first and a second terminal;
   - said first terminal receiving the combined signal output of said first means;
   - each of said variable admittance circuits further comprising a plurality of branch circuits each having diode means and admittance means connected in series between an input and a bias control terminal;
   - all of said input terminals of each network being connected in common to the first terminal of its associated network;
   - single bias means coupled to all of said bias control terminals of said first and second networks for establishing a different bias level at each of said bias control terminals; and
   - the network second terminal of said first and second networks being connected in common to said bias means for producing a resultant output current which is a piecewise linear approximation of the desired modulation characteristic curve and which suppresses the carrier wave from the output.

2. An electronic resolver comprised of first and second balanced modulators each being of the type described in claim 9 wherein said bias means is coupled in common to the bias control terminals of the branch circuits of all of said variable admittance circuits and wherein the second terminals of said first and second balanced modulators are connected in common to said bias means; the input signals at each of the four first terminals being in phase quadrature to generate a signal at the common connection of said second terminals which synthesizes orthogonally modulated vectors.

3. Circuitry for modulating a carrier wave and a superimposed modulating signal comprising:
   - first means for summing said carrier wave and said modulating signal;
   - a variable admittance circuit for generating an output signal whose value is functionally related to the instantaneous values of the output signal of said summing means comprising:
   - an input terminal coupled to the output of said summing means;
   - a plurality of two-terminal unidirectional admittance branch circuits each having a series connected diode and resistor a first terminal of every branch circuit being coupled to said input terminal;
   - biasing means for controlling the conduction level of each of said branch circuits;
   - said biasing means comprising a plurality of series connected bleeder resistors each being connected between the second terminals of a pair of adjacent branch paths and a plurality of capacitors each being connected in parallel across an associated bleeder resistor; and
   - an output terminal coupled to a common terminal between a predetermined pair of said bleeder resistors.

4. A balanced modulator for suppressed carrier modulation of a carrier wave by a modulating signal comprising:
   - first and second means for simultaneously summing said carrier wave and said modulating signal;
   - a pair of variable admittance circuits for generating an output signal whose value is functionally related to the instantaneous values of the output signal of one of said summing means each comprising:
   - an input terminal coupled to the output of an associated one of said summing means;
   - a plurality of two-terminal unidirectional admittance branch circuits each having a series connected diode and resistor a first terminal of every branch circuit being coupled to its associated input terminal;
   - single biasing means for controlling the conduction level of each of said branch circuits of said pair of variable admittance circuits;
   - said biasing means comprising a plurality of series connected bleeder resistors each being connected between the second terminals of adjacent branch paths in each pair of variable admittance circuits and a plurality of capacitors each being connected in parallel across an associated bleeder resistor; and
   - an output terminal coupled to a common terminal between a predetermined pair of said bleeder resistors.

5. An electronic resolver for orthogonally modulating a carrier wave with a modulating signal comprising:
   - first, second, third and fourth means for simultaneously summing said carrier wave and said modulating signal;
   - first, second, third and fourth variable admittance circuits for generating an output signal whose value is functionally related to the instantaneous values of the output signal of said summing means each comprising:
   - an input terminal coupled to the output of said summing means;
   - a plurality of two-terminal unidirectional admittance branch circuits each having a series connected diode and resistor, a first terminal of every branch circuit being coupled to said input terminal;
   - biasing means for controlling the conduction level of each of said branch circuits of all of said variable admittance circuits;
   - said biasing means comprising a plurality of series connected bleeder resistors each being connected between the second terminals of adjacent branch paths of all of said variable admittance circuits and a plurality of capacitors each being connected in parallel across an associated bleeder resistor; and
   - an output terminal coupled to a common terminal between a predetermined pair of said bleeder resistors.

6. The modulator of claim 2 further comprising a current to voltage conversion means coupled to said output terminal.

7. The modulator of claim 6 further comprising band-pass filter means coupled to said conversion means for suppressing undesired frequencies from the output supplied by said conversion means.